May 23, 1972            H. R. JEX            3,664,731

APPARATUS FOR DETERMINING EYE POINT-OF-REGARD

Filed Sept. 10, 1970            2 Sheets-Sheet 1

INVENTOR
HENRY R. JEX

BY *Roy M. Pitts*
ATTORNEY

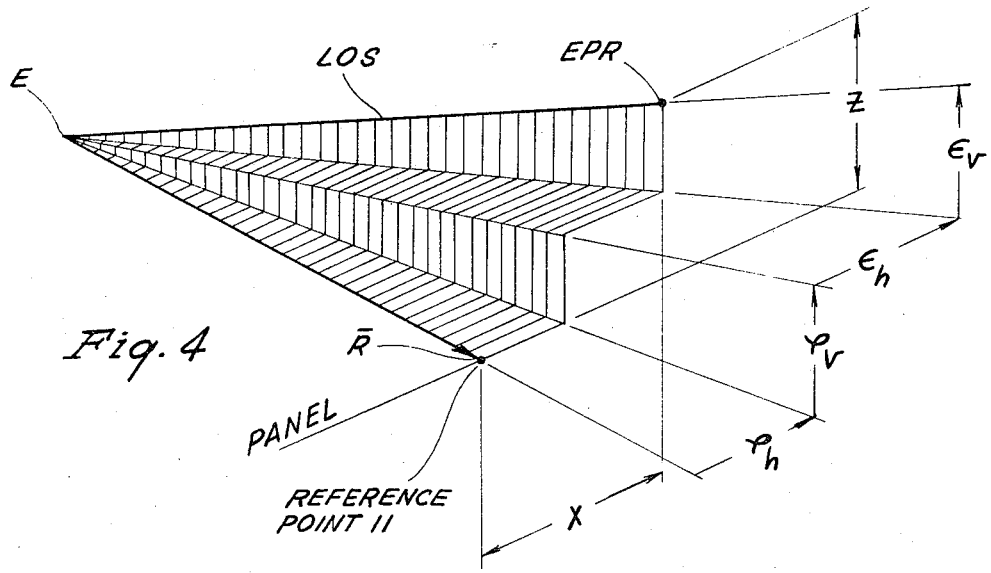
Fig. 4
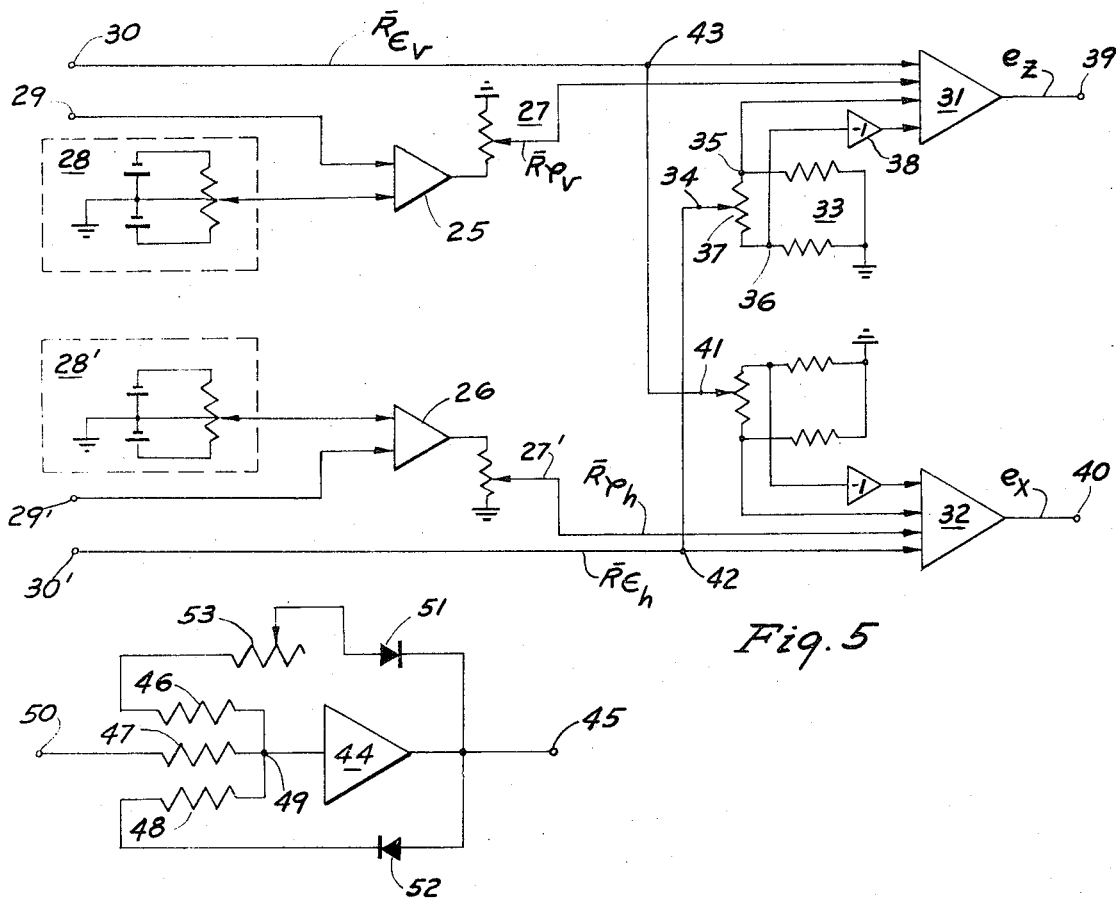
Fig. 5
Fig. 6
INVENTOR
HENRY R. JEX
BY *Roger Pitts*
ATTORNEY

United States Patent Office 3,664,731
Patented May 23, 1972

3,664,731
APPARATUS FOR DETERMINING EYE POINT-OF-REGARD
Henry R. Jex, Santa Monica, Calif., assignor to Systems Technology, Inc.
Filed Sept. 10, 1970, Ser. No. 71,054
Int. Cl. A61b 3/10
U.S. Cl. 351—7                                          19 Claims

ABSTRACT OF THE DISCLOSURE

Apparatus for measuring the point-of-regard of the eye of an operator relative to a preselected local coordinate system. Sighting means is employed to either restrain or measure the eye point-of-regard relative to the orientation of the operator's head. Orientation of the operator's head is determined relative to a reference direction by means of a goniometer, one input end of which is adapted to be mounted relative to the operator's head. The other input end of the goniometer includes an extensible member adapted to be connected to a reference structure for providing the reference direction.

BACKGROUND OF THE INVENTION

The invention described herein was made in the performance of work under a NASA contract and is subject to the provisions of Section 305 of the National Aeronautics and Space Act of 1958, Public Law 85–568.

The field of the subject invention relates to the measurement of the direction of the visual point-of-regard of the eye of a human operator engaged in and during a visual scanning operation and relative to a preselected coordinate system. Such on-stream measurement of the eye's point-of-regard (EPR) is especially useful in sophisticated monitoring or control systems which include a human operator in the control loop.

Prior-art devices for measuring of the direction of the eye's point-of-regard (EPR) have included the use of photographic recording means or movies, which did not provide "on-stream" measurement, due to the necessary delays involved in processing the film. Nor did such techniques provide direct indications of EPR, but relied upon "interpretations" of such films by skilled photo interpreters.

Other prior-art means for determining EPR have included sensing and electrical signal means for "on-stream" indication eye angles relative to the head of the subject or human operator. Such schemes, providing a pair of signals corresponding to components of the EPR direction angle (resolved relative to orientation of the subject's head) and numerous and involved instrumentation of the eye by equipment adapted to be worn by the subject or human operator. Such techniques include electrooculography (EOG) in which electrodes are placed about the eye (which itself cooperates as a minature battery) to generate voltages indicative of the elevation and azimuth direction angles of the EPR relative to the subject's face.

Another anad perhaps currently preferred technique is an infrared corneal-scleral contrast detection technique, utilizing the differential contrast between the dark iris and light sclera, as sensed by infrared photo-diodes. Such contrast changes are related to changes in the eye's orientation relative to an instrumented spectacle frame worn on the subject's head, a commercial version of which is marketed as Model SGHV-2 Eye Movement Device by Biosystems, Inc., formerly a division of Space Sciences, Inc., Waltham, Mass. A further description of such device and technique is set forth in U.S. Pat. 3,473,868 issued to L. R. Young et al. for Eye Position and Movement Monitor.

In such arrangement, at least four sensors spaced proximate to and about the eye are utilized to develop elevational and azimuthal eye orientation information from preselected comparisons of or differences between pairs of sensors. However, limitations in the installation geometry of such instrumentation art result in considerable cross talk between channels. In other words, eye movements in elevation tend to result in azimuthal output signals and movements in azimuth tend to produce elevation output signals, in addition to the normal signals of interest. Further, certain sense-dependent non-linearities appear to occur and correspond to changes in signal gain associated with reversal in signal sense. For example, left-direction indicating signals may not be of the same sensitivity as right-direction indicating signals. Such effects of bipolar gain sensitivity and cross-talk tend to impose serious limitations on the accuracy and hence utility of such instrumentation.

Still further, such eye direction detection techniques, in determining the EPR relative to the face or head of the subject, still do not determine the EPR relative to a preselected local coordinate system, relative to which the subject's head may change orientation or position.

The prior art has included various devices for the measurement of the orientation of an operator's head, such devices including polarized light sources in cooperation with helmets having polarizers, and the like. Many of these devices are heavy and awkward to wear. Also, many of them require that the position of the head be constrained in order to effect the head angle measurement. Moreover, none of these techniques employ the measurement of both head orientation and eye angle to determine the EPR direction angle.

SUMMARY OF THE INVENTION

By means of the concept of the invention, the above-noted short-comings of the prior art are overcome and improved means is provided for indicating the eye's point-of-regard relative to a local coordinate system.

In a preferred embodiment of the invention there is provided sighting means adapted to be worn by an operator for establishing an orientation of the operator's head for a given line of sight associated with a point-of-regard. There is also provided goniometer means adapted to be mounted relative to the head of the operator and oriented by an extensible member adapted to be fastened to a reference station corresponding to the center of the coordinate system.

In a further aspect of the invention, there may be provided means for combining electrical signals indicative of eye movement (relative to the head) with goniometer electrical signals indicative of head orientation and in which compensatory means may be included to compensate for the above-noted cross-talk and bipolar sensitive gain variations.

In normal operation of such arrangement, there are generated at least two electrical output signals corresponding to two mutually orthogonal components of a resolved direction angle associated with the head referenced line of sight and the reference line represented by the extensible member. This measurement is achieved despite nominal head movement and without the use of cumbersome equipment, or devices for restraining head movement. Further, the performance of such improved equipment exceeds that of the prior art.

Accordingly, it is an object of the present invention to provide simple and effective means for establishing the orientation of an operator's head associated with a given eye point-of-regard.

It is another object of the invention to provide simple and effective means for establishing a direction relative to a preselected local coordinate system.

A further object is to provide improved means for indicating an eye point-of-regard relative to a local coordinate system by combining electrical signals indicative of eye movement relative to a subject's head and electrical signals indicative of the orientation of the observer's head.

Another object is to provide compensation of the electrical outputs of sensors of eye movement for improved measurement accuracies.

These and other objects of the invention will become apparent from the following description, taken together with the accompanying drawings in which:

BRIEF DESCRIPTION OF THE DRAWINGS

FIG. 4 is an illustration of the geometry of a further aspect of the invention;

FIG. 5 is a schematic diagram of an alternate system representing a further embodiment of the invention; and FIG. 6 is a circuit diagram of a further aspect of the invention.

In the drawings, like reference characters refer to like parts.

DESCRIPTION OF THE PREFERRED EMBODIMENTS

Figure 1:
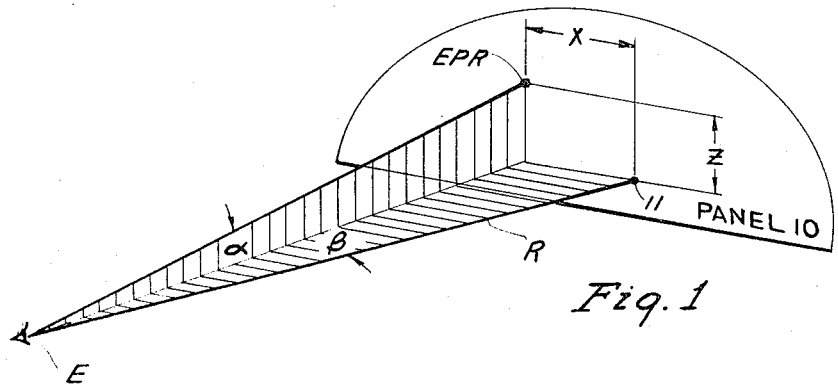
FIG. 1 is an illustration of the geometry of a representative viewing situation.

Referring now to FIG. 1, there is illustrated the geometry of a representative viewing situation in which the concept of the invention may be utilized. There is illustrated an exemplary viewing plane 10 such as an instrument panel having a point-of-regard EPR thereon located at a distance from a reference point 11 on panel 10. Such point-of-regard may correspond to an instrument or portion of an indicator panel under surveillance by a human operator, or some other object of interest, located at point E. The spatial separation of EPR from reference point 11 may be indicated by two mutually orthogonal level components X and Z measured in the plane of panel 10. Such spatial separation also corresponds to an angle subtended at the point of the observer's eye, and which may be resolved into two mutually orthogonal components, $\alpha$ and $\beta$, the plane of the angle $\alpha$ including the (nominally vertical) Z dimension and the plane of the angle $\beta$ including the (nominally horizontal) X dimension. In general, the eye point-of-regard coordinates Z and X may be computed for a given radial distance $\bar{R}$, by standard trigonometric relationships. However, where the radial distance $\bar{R}$ from the operator's eye to the reference point 11 is considerably greater than a respective one of dimensions X and Z, such dimension may be determined with sufficient accuracy by the product of $\bar{R}$ and the associated one of angles $\beta$ and $\alpha$, respectively.

Also, it is clear that for nominal changes (up/down or sideways) in the position of the observer's head, relative to the radial distance $\bar{R}$ to point 11, the angles $\beta$ and $\alpha$ are substantially unaffected, and accordingly, the dimensions, $X \approx \bar{R}\beta$ (radians) and $Z \approx \bar{R}\alpha$ (radians), are substantially unaffected. Therefore, the determination of such dimensions from such angles need not require that the operator's head be severely or unreasonably physically constrained, as indicated by the arrangement in FIG. 2.

Figure 2:
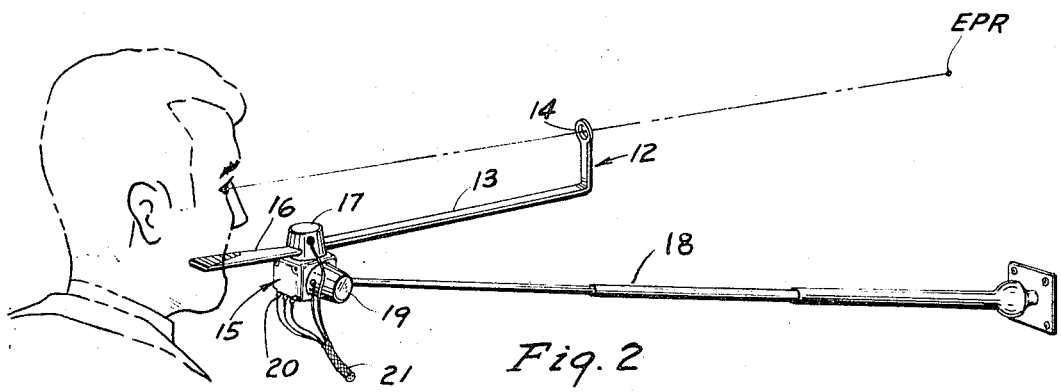
FIG. 2 is a perspective view of one aspect of the invention, illustrating means for establishing a directional reference for a goniometer.

Referring to FIG. 2, there is illustrated an embodiment of one aspect of the invention for measuring the EPR of an operator relative to a local coordinate system. There is provided a goniometer assembly 15 having, for example, a bite bar 16 detachably mounted on one input element 17 of goniometer assembly 15 and adapted to be held between the teeth of the observer. An extensible member, for example a rigid telescoping tubular element 18 is included, having one end mechanically coupled to a second input element 19 of goniometer assembly 15 and having a distal second end adapted to be rotatably fastened to a reference station corresponding to a center or reference point of the local coordinate system. There is also provided sighting means 12, mounted upon and extending forwardly (as illustrated) of goniometer input element 17, for establishing an orientation of the head for a given line of sight (LOS) associated with a selected point-of-regard. Such sighting means may include a frame 13 having a sighting reticle 14.

Goniometer assembly 15 is essentially resolver means for providing two electrical output signals corresponding to two mutually orthogonal components of a resolved direction angle; and may be comprised of two angle pickoffs or transducers such as potentiometers. Base element 20 of goniometer 15 may include a first and second stator element arranged to cooperate with a respective one of a rotor or wiper element mounted in input elements 17 and 19. Excitation of the stator elements may be externally applied to, and position pick-off (or transducer output) signals obtained from, assembly 15 by means of a lightweight multiconductor or cable assembly 21.

Figure 3:
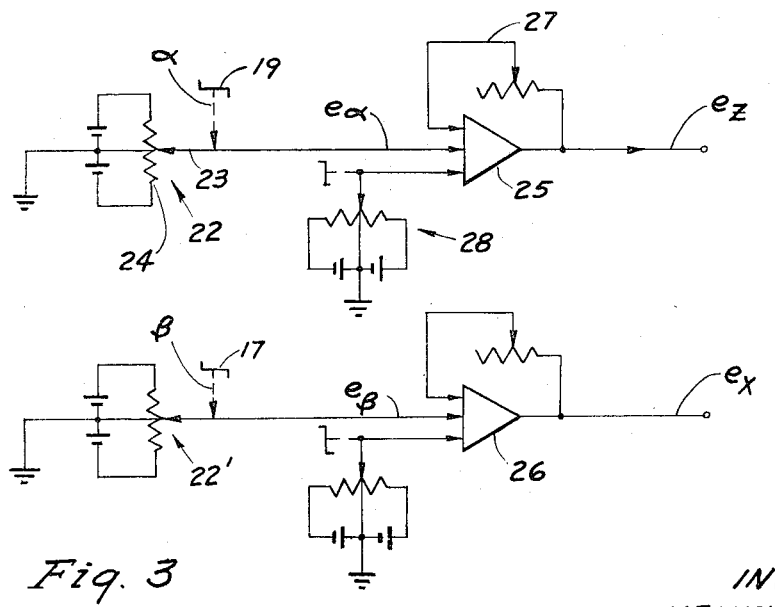
FIG. 3 is a schematic diagram of a system in which the device of FIG. 2 may be advantageously utilized.

A system utilizing the goniometer assembly 15 of FIG. 2 to effect an indication of eye point-of-regard is shown schematically in FIG. 3. In such figure, there is provided two substantially like signalling channels for generating output signals $e_z$ and $e_x$ indicative of a respective one of parameters Z and X in FIG. 1. There is included in each channel a pick-off element or center tapped potentiometer 22 having a wiper 23 and resistor element 24 corresponding to the rotor and stator or base element portions of goniometer 15 of FIG. 2 for indicating the sense and magnitude of a respective one of angles $\alpha$ and $\beta$ of FIG. 1 by means of signal voltages $e_\alpha$ and $e_\beta$. The output of each pickoff 22 is fed to an associated adjustable gain amplifier 25, the gain K of which may be adjusted proportionately with the dimension $\bar{R}$ of FIG. 1. The output $e_z$ of amplifier 25 which varies as the product of the applied input thereto and the adjusted gain, is thus indicative of the coordinate $Z \approx \alpha\bar{R}$; while the output $e_x$ of amplifier 26 in the second channel is indicative of the coordinate, $X \approx \beta\bar{R}$ of FIG. 1. Further changes in the radial dimension $\bar{R}$ (in FIG. 1) would require further gain adjustment of amplifiers 25 and 26. Provisions for conveniently effecting such gain adjustments may be made by means of lineal position pickoffs included in and responsive to the telescoping action of telescoping rod 18.

Where the rotatably mounted distal end of Rod 18 of FIG. 2 is not precisely coincident with the desired or preselected center or reference point 11 of the cartesian coordinate system illustrated in FIG. 1, then an adjustable bias injut source 28 may need be provided for each of amplifiers 25 and 26. With the operator's head oriented so as to restrain the operator's line of sight through reticle 14 (in FIG. 2) to the reference point 11, each of the adjustable bias sources is adjusted until the output of the associated one of amplifiers 25 and 26 is nulled, indicating that the system is now null-calibrated. Such null-calibration not only accounts for any displacement between reference point 11 and the distal end of rod 18, but also for directional bias contributed by the reticle 14 due to the geometry of a particular observer's mode of mounting reticle 14 and bite-bar 16 of assembly 15 and geometrical tolerances in the equipment itself. Any subsequent reorientation of the operator's head to effect a change in the EPR viewed reticle 14 of FIG. 2 will result in a set of output signals $e_x$ and $e_z$ indicative of the coordinates (X, Z) of such EPR.

Gain calibration of amplifiers 25 and 26 may be effected by employing a preselected EPR for which the dimensions X and Z have been determined by scaling-off such dimensions upon the reference plane 10. Then, with the operator's head oriented so that his line of sight through the reticle intersects such preselected EPR, the gain adjusting means 27 of amplifier 25 may be adjusted to effect a preselectively scaled output voltage $e_z$ corresponding to the measured dimension Z, and the gain of amplifier 26 similarly adjusted to obtain a preselectively scaled output voltage $e_x$, as is well understood by the analog computing art.

Although sight means 13 has been described and illustrated in terms of a sighting reticle integral with or mounted upon input element 17 of goniometer 15 (of FIG. 2), it is clear that the sighting means is not so limited and may include spectacles mounting a reticle and worn apart from the wearing of the bite-bar mounted goniometer. Alternatively, such sighting means may include a sighting reticle mounted in front of the eye by means of a head band.

In a more sophisticated arrangement embodying the invention, it may be deemed desirable to avoid restraining the position of the eye relative to the head and/or trying to move the head in an attempt to cause the line of sight (LOS) to track a target moving relative to the observer. In such event, indicated changes in the position of the LOS relative to orientation of the head must be combined with concomitant indications of such orientation of the head, to effect the desired indication of the EPR, as shown in FIG. 4.

Referring to FIG. 4, there is illustrated the geometry of a representative viewing situation involving the determination of the EPR for the LOS moving relative to the orientation of the observer's head (as viewed from behind a viewing or instrument panel and toward an observer in front of the panel). The plane of the panel (in phantom) includes the EPR located at a position (X, Z) from a reference point 11 located at a radial distance $\overline{R}$ from an observer at station E, corresponding generally to the situation depicted in FIG. 1. The spatial separation of point 11 and the EPR corresponds to a set of angles subtended at station E comprising an orientation angle $\rho$ of the observer's head relative to the radial reference line $\overline{R}$, and an eye movement angle $\epsilon$ relative to the observer's head. Each of these angles $\epsilon$ and $\rho$ may be resolved into two mutually orthogonal components $\epsilon_h$, $\epsilon_\nu$, and $\rho_h$, $\rho_\nu$, respectively. Thus the sum $(\rho_\nu + \epsilon_\nu)$ corresponds to the angle $\alpha$ in FIG. 1 and the sum $(\rho_h + \epsilon_h)$ corresponds to the angle $\beta$ in FIG. 1, which may be the measurement of interest. As noted before for a given radian $\overline{R}$ the EPR coordinates can be precisely computed by standard trigiometric functions. Alternatively, where the dimensions $\overline{R}$ is much larger than either of X or Z, then the dimension X may be determined from the product $\overline{R}$ $(\rho_h + \epsilon_h)$ radians, and the dimension Z determined from the product $\overline{R}$ $(\rho_\nu + \epsilon_\nu)$ radians.

A system for determining the components of the spatial separation of the EPR and point 11, utilizing the goniometer arrangement of FIG. 2 and responsive to eye motion of the observer's eye, is shown schematically in FIG. 5.

Referring to FIG. 5, there is illustrated a schematic diagram of a further embodiment of the invention. There are provided two summing amplifiers 25 and 26 having output gain adjusting means 27 and 27' respectively and adjustable bias input sources 28 and 28', corresponding to like referenced elements of FIG. 3. A second input terminal 29 and 29' of amplifiers 25 and 26 is adapted to be connected to a respective one of the outputs from the two position pickoffs 22 and 22' (in FIG. 3) and corresponding to elements of the goniometer assembly 15 of FIG. 2. The gain-adjusted outputs of amplifiers 25 and 26 are fed to a respective one of two further summing amplifiers 31 and 32. A second input is applied to a respective one of amplifiers 31 and 32 via input terminals 30 and 30' and corresponding to the components of resolution of eye movement. Such an input may be obtained from an eye movement detector device such as, for example, that described in the above-noted U.S. Pat. 3,473,868. Where summing amplifier 31 serves as a vertical dimension signalling channel, responsive to the vertical component of the observer's head orientation, then terminal 30 is connected to that output of the movement detector which is indicaive of vertical eye movement while terminal 30' of summing amplifier 31 is connected to that output of the eye movement detector which is indicative of horizontal eye movement.

As above mentioned in connection with the description of the prior art, there is considerable cross-talk and other non-linear effects in the output of eye movement detectors such as the type described in the above-noted U.S. Pat. 3,473,868. However, I have discovered that such undesired cross-talk effects may be substantially attenuated in my device by the use of compensatory cross-talk, in which a portion of the eye movement signal in one channel is crossfed with a selected sense and gain to the output summing amplifier 31 or 32 of the other channel, so as to oppose such undesired cross-talk.

For example, the vertical component eye movement signal on input terminal 30' of amplifier 32 may be fed to a four terminal network or bridge 33 having an input terminal 34, a common ground terminal, a first and second output terminal 35 and 36. The resistive element of potentiometer 37 is connected across terminals 35 and 36, the wiper of potentiometer 37 forming the input terminal 34 of network 33. Thus, the balance or null difference potential between terminals 35 and 36 in response to an applied crossfed input on terminal 34 may be selectively adjusted by adjusting potentiometer 37. Terminal 35 comprises a third input terminal of summing amplifier 31, while phase-inverting means 38 couples terminal 36 to a fourth input of amplifier 31.

In normal cooperation of the first signal channel comprising summing amplifier 31, a resolved head angle position signal input on terminal 29 of amplifier 25 is selectively biased by bias means 28; the gain of the biased head angle signal output of amplifier 25 is then selectively adjusted by gain-adjusting means such as output potentiometer 27 prior to application as a first input $$\overline{R}\rho_\nu$$

to summing amplifier 31. The summing of the applied input $$\overline{R}\epsilon_\nu$$

on terminal 30 with the $$\overline{R}\rho_\nu$$

input from potentiometer 27 provides an output signal $e_z$ on output terminal 39 corresponding to dimension Z in FIG. 4. A similar processing of the head angle and eye movement inputs on terminals 29' and 30' provides an output signal $e_x$ on output terminal 40 of summing amplifier 32 and corresponding to dimension X in FIG. 4. The crossfeed of the eye movement signal on terminal 30' to terminal 34 provides a compensatory bias at the summing input of amplifier 31 which compensates for adverse cross-talk effects in the applied inputs on terminal 30 of amplifier 31, while crossfeed of the input on terminal 30 to terminal 41 provides similar compensatory biasing of amplifier 32.

In addition to the adverse cross-talk present in the eye-movement signals applied to terminals 30 and 31' (and which is compensated for by the arrangement of FIG. 5), such signals may demonstrate a bipolar responsive sensitivity. In other words, the signal sensitivity of the eye movement sensor (not shown) tends to vary with a change in sense of eye movement. For example, signals of one sense on terminal 30 and indicative of upward eye movement may be of a different sensitivity than that of signals of opposite sense indicative of downward eye movement, as to further effect the accuracy of the resolved point-of-regard signal occurring on output terminal 39. Such performance limitations in the outputs of amplifiers 31 and 32 may also be compensated for by a further aspect of the invention, as shown in FIG. 6.

Referring now to FIG. 6, there is shown bipolar sensitive gain-adjusting means for compensatorily adjusting the gain of the resolved eye movement signals as a function of the sense thereof. There is illustrated a high gain, phase-inverting operational amplifier 44 arranged in feedback cooperation and having an output terminal 45, summing input network formed three input impedances 46, 47 and 48 having a commonly connected first terminal 49 connected to an input of amplifier 44, a second terminal 50 of input impedance 47 comprising an input terminal to the device of FIG. 6. Impedances 46 and 48 comprise feedback impedances, a second terminal of each of which being coupled to the output 45 of amplifier 44 by a respective one of oppositely-poled diodes 51 and 52. An adjustable impedance 53 may be inserted in series circuit with feedback impedance 46 to adjust the total feedback impedance cooperating with diode 51 relative to that cooperating with diode 52.

In normal operation of the feedback device of FIG. 6, the closed-loop gain or signal sensitivity in response to an applied input on terminal 50 will be a function of the ratio of the operative feedback impedance to the input impedance 47, as is well understood in the analog computing art. However, only that one of the two feedback impedance circuits will be operative for which the associated diode polarity corresponds to the signal polarity of the output signal on output terminal 45. Because the impedance value of each of the two oppositely poled unipolarly conductive feedback impedances is different, a first signal sensitivity or gain is obtained for applied signals of one sense and a different second sensitivity or gain obtained for signals of the opposite sense.

A device according to FIG. 6 may be interposed in circuit between terminal 43 and the associated input of amplifier 31 (in FIG. 5) and another such device interposed in circuit between terminal 42 and an associated input of amplifier 32. However, in a preferred embodiment such devices would preferably be interposed between terminals 30 and 43 (in FIG. 5) and between terminals 30' and 42, in order that the benefits of such resultant sensitivity or gain compensation are also applied to the compensatory crossfed signals.

Accordingly, there has been described means for generating signals indicative of eye point-of-regard. Although the preferred embodiments have been described and illustrated in terms of analog signalling equipment, it is clear that the concept of the invention is not so limited and that equivalent digital devices may be substituted with like effect.

Although the invention has been illustrated and described in detail, it is to be clearly understood that the same is by way of illustration and example only and is not to be taken by way of limitation, the spirit and scope of the invention being limited only by the terms of the appended claims.

I claim:

1. A machine method for determining the point-of-regard of an eye of an operator, comprising the steps of generating signals indicative of the eye point-of-regard relative to the head of the operator; generating signals indicative of the orientation of said head relative to a preselected local coordinate system and combining signals indicative of the orientation of the head of the operator with signals indicative of the direction of the eye point-of-regard relative to said head.

2. The method of claim 1 in which said generated signals are indicative of mutually orthogonal components of respective ones of said head orientation and said eye point-of-regard relative to said head, and in which said step of combining includes the further steps of generating an azimuthal component output signal indicative of an azimuthal component of eye point-of-regard by combining an azimuthal component of each of said head orientation and relative eye point-of-regard signals;

generating an elevation component signal indicative of an elevational component of eye point-of-regard by combining an elevational component of each of said head orientation and relative eye point-of-regard signals; and compensatorily cross feeding a portion of each of said azimuthal and elevational relative eye point-of-regard signals to an input of a respective one of said elevation component output signal and said azimuth component output signal to compensate for signalling errors present in said signals generated indicative of said relative eye point-of-regard.

3. Apparatus for measuring the point-of-regard of the eye of an operator, relative to a preselected local coordinate system comprising means responsive to the angular motion of said eye relative to the head of the operator for providing a first and second electrical signal indicative of the movement in elevation and azimuth respectively of said eye;

goniometer means cooperating with the head of an operator and attachable to a reference structure for providing a first and second electrical signal indicative of the orientation in azimuth and elevation respectively of said head; and signal combining means responsive to said electrical signals from said first and second mentioned means for providing a first and second electrical output signal indicative of the orientation in elevation and azimuth respectively of the point-of-regard of said eye.

4. In a device for measuring the point-of-regard of the eye of an operator and having means responsive to the angular motion of said eye in its socket, the combination comprising goniometer means cooperating with the head of an operator and attachable to a reference structure for providing a first and second electrical signal indicative of the orientation in elevation and azimuth respectively of said head; and signal combining means responsive to said first and second mentioned means for providing a first and second electrical output signal indicative of the orientation in elevation and azimuth respectively of the point-of-regard of said eye.

5. The device of claim 4 in which said goniometer means comprises an extensible member attachable at one end to a point of a reference structure;

a base member having two mutually orthogonal axes;

a first rotatable member rotatably mounted upon said base member for rotation about a first one of said axes and demountably mounted relative to an operator's head; and a second rotatable member rotatably mounted upon said base member for rotation about a second one of said mutually orthogonal axes and rigidly connected to a second end of said extensible member.

6. The device of claim 4 in which said goniometer means comprises a telescopic rod rotatably attachable at one end to a point of a reference structure;

a base member having two mutually orthogonal axes;

a first rotatable member rotatably mounted upon said base member for rotation about a first one of said axes and demountably mounting a bite bar at right angles to said first axis of rotation; and a second rotatable member rotatably mounted upon said base member for rotation about a second one of said mutually orthogonal axes and rigidly connected to a second end of said telescoping rod.

7. The device of claim 5 in which
said base member and said first rotatable member comprise a first electrical pickoff means for providing a first signal corresponding to an azimuth direction; and
said base member and said second rotatable member comprise a second electrical pickoff means for providing a second signal corresponding to an elevation direction.

8. Apparatus for measuring the point-of-regard of the eye of an operator relative to a preselected local coordinate system, comprising
means responsive to the angular motion of said eye relative to the head of the operator for generating electrical signals indicative of the angular movement of said eye;
means to cooperate with the head of said operator and attachable to a reference structure for generating electrical signals indicative of the angular orientation of said head in said local coordinate system; and
signal combining means responsive to said signals from said first and second mentioned means for providing electrical signals indicative of the direction angle of said eye point-of-regard in said local coordinate system.

9. The device of claim 8 in which second mentioned means for generating electrical signals indicative of the head angular orientation includes
a first and second angle pickoff means, each comprising two elements relatively rotatable relative to each other;
one element of one pickoff means being fixed relative to one element of said second pickoff, said first and second pickoff means being mutually oriented to be responsive to mutually orthogonal angular motion;
an extensible reference member having a first end rigidly connected to a second element of said first pickoff means and a distal second end connected to a reference structure for establishing a reference direction; and
head mounting means in cooperation with a second element of said second pickoff means and mounted on the head of an operator, for determination of the orientation of the operator's head relative to said directional reference provided by said extensible reference member.

10. The device of claim 8 in which second mentioned means for generating electrical signals indicative of the head angular orientation includes
a first and second angle pickoff means, each comprising two elements relatively rotatable relative to each other;
one element of one pickoff means being fixed relative to one element of said second pickoff, said first and second pickoff means being mutually oriented to be responsive to mutually orthogonal angular motion;
a telescoping rigid rod having a first end rigidly connected to a second element of said first pickoff means and a distal second end connected to a reference structure for establishing a reference direction; and
a bite-bar detachably connected to a second element of said second pickoff means and held in the mouth of an operator, for determination of the orientation of the operator's head relative to said directional reference provided by said telescoping rod.

11. The device of claim 8 in which said second mentioned means for generating electrical signals indicative of the head angular orientation includes
a first and second angle pickoff means, each comprising two elements relatively rotatable relative to each other;
one element of one pickoff means being fixed relative to one element of said second pickoff, said first and second pickoff means being mutually oriented to be responsive to mutually orthogonal angular motion;
an extensible reference member having a first end rigidly connected to a second element of said first pickoff means and a distal second end connected to a reference structure for establishing a reference direction; and
a bite-bar detachably connected to a second element of said second pickoff means and held in the mouth of an operator, for determination of the orientation of the operator's head relative to said directional reference provided by said extensible reference member.

12. The device of claim 8 in which each of said first and second means are arranged to provide a first and second electrical signal corresponding to two mutually orthogonal components of resolution of the corresponding angular motion to which it responds, said signal combining means comprising two signal channels, each channel comprising
a summing amplifier responsive to said electrical signals corresponding to a like component of resolution of said eye angular movement and said head angular orientation; and
gain-adjusting means for adjusting the gain of said signal corresponding to said eye movement relative to that of said signal corresponding to said head orientation.

13. The device of claim 12 in which each of said signal channels further includes a compensatory crossfeed signal input from the other of said channels for reducing crosstalk instrumentation effects.

14. The device of claim 12 in which each of said signal channels further includes
first adjustable bias means for adjusting the electrical null condition of said eye movement signals; and
adjustable input means for coupling an eye movement signal from one channel as an input to a summing means of another channel in a selected sense.

15. The device of claim 12 in which each of said signal channels further includes compensatory crossfeed means comprising
an adjustable signal splitter having an input terminal responsive to an eye movement signal from the other of said channels, a first and second output of said signal splitter being fed as inputs to said summing amplifier; and
signal inverting means interposed between one of said outputs of said signal splitter and an associated input of said summing amplifier.

16. Apparatus for measuring the point-of-regard of an eye of an operator, relative to a local coordinate system comprising
sighting means for establishing an orientation of the operator's head for a given line of sight associated with a point-or-regard; and
resolver means cooperating with said sighting means and including a bite bar to be held in the mouth of said operator and restrained in orientation by a rigid telescoping member fastening to a reference station corresponding to a center of said coordinate system, said resolver means further including first and second transducers for providing two electrical output signals corresponding to first and second mutually orthogonal components of a resolved direction angle of said head and associated with said line of sight.

17. The device of claim 16 in which there is further included
first and second signal summing means responsive to a respective one of said two electrical output signals of said resolver; and first and second signalling means for applying a variable bias electrical input to a respective one of said summing amplifiers, whereby the electrical outputs of said summing amplifiers corresponds to the components of the resolved angle of said eye point-of-regard relative to a selected local coordinate system.

18. The device of claim 17 in which said sighting means includes means responsive to the angular motion of said eye relative to the head of the operator for providing two electrical signals corresponding to two mutually orthogonal components of resolution of said eye angular motion, each of said first and second summing means being responsive to a respective one of said two electrical signals for said sighting means.

19. The device of claim 18 in which there is further provided gain adjusting means interposed between said sighting means and said summing means for adjusting the sensitivity of said electrical signals corresponding to said eye angular motion relative to the sensitivity of said electrical signals corresponding to said direction angle of said head; and adjustable crossfeed signalling means for selectively crossfeeding the eye movement signal input of one of said first and second summing means as an ancillary compensatory input to the other of said first and summing means of selected gain and sense.

References Cited

UNITED STATES PATENTS 3,450,466  6/1969  Streisinger.

DAVID SCHONBERG, Primary Examiner

D. A. SACHER, Assistant Examiner

U.S. Cl. X.R.

33—174 D; 351—1, 39